(12) United States Patent
Traster

(10) Patent No.: US 8,301,325 B2
(45) Date of Patent: Oct. 30, 2012

(54) SYSTEM AND METHOD FOR AUTONOMOUS VEHICLE LOCALIZATION

(75) Inventor: Elden D. Traster, Indianapolis, IN (US)

(73) Assignee: Precise Path Robotics, Inc., Indianapolis, IN (US)

( * ) Notice: Subject to any disclaimer, the term of this patent is extended or adjusted under 35 U.S.C. 154(b) by 1096 days.

(21) Appl. No.: 12/180,844

(22) Filed: Jul. 28, 2008

(65) Prior Publication Data

US 2010/0023195 A1    Jan. 28, 2010

(51) Int. Cl.
*G01C 22/00*    (2006.01)

(52) U.S. Cl. .......................................... 701/23

(58) Field of Classification Search ................ 701/10, 701/23, 32.3, 32.5, 116, 408, 410, 420, 444, 701/451, 469, 470, 472
See application file for complete search history.

(56) References Cited

U.S. PATENT DOCUMENTS

| | | |
|---|---|---|
| 4,679,152 A | 7/1987 | Perdue |
| 4,710,020 A | 12/1987 | Maddox et al. |
| 4,751,689 A | 6/1988 | Kobayashi |
| 4,829,442 A | 5/1989 | Kadonoff et al. |
| 4,924,450 A | 5/1990 | Brashear et al. |
| 4,939,701 A | 7/1990 | Brunner et al. |
| 5,009,277 A | 4/1991 | Sindeband et al. |
| 5,165,064 A | 11/1992 | Mattaboni |
| 5,204,814 A | 4/1993 | Noonan et al. |
| 5,280,457 A | 1/1994 | Figueroa et al. |
| 5,491,670 A | 2/1996 | Weber |
| 5,517,098 A | 5/1996 | Dong |
| 5,615,132 A | 3/1997 | Horton et al. |
| 5,652,593 A | 7/1997 | Rench et al. |
| 5,682,313 A | 10/1997 | Edlund et al. |
| 5,708,421 A | 1/1998 | Boyd |
| 5,831,937 A | 11/1998 | Weir et al. |
| 5,940,346 A * | 8/1999 | Sadowsky et al. ............ 367/128 |
| 5,943,295 A | 8/1999 | Varga et al. |
| 6,157,592 A | 12/2000 | Kriz et al. |
| 6,327,219 B1 | 12/2001 | Zhang et al. |
| 6,389,329 B1 | 5/2002 | Colens |
| 6,404,703 B1 | 6/2002 | Burrell |
| 6,590,834 B1 | 7/2003 | Highfill |
| 6,674,687 B2 | 1/2004 | Zeitzew |
| 6,784,842 B2 | 8/2004 | Vesuna |
| 7,012,521 B2 | 3/2006 | Fardin et al. |
| 7,024,278 B2 | 4/2006 | Chiappetta et al. |

(Continued)

FOREIGN PATENT DOCUMENTS

KR    10-0565227 B1    3/2006

(Continued)

OTHER PUBLICATIONS

Alvarez, Fernando J. et al. "Detecting ultrasonic signals in a turbulent atmosphere: performance of different codes". 1-4244-0830-X/07/ $20.00 2007. IEEE.

(Continued)

*Primary Examiner* — Kim T Nguyen
(74) *Attorney, Agent, or Firm* — Woodard, Emhardt, Moriarty, McNett & Henry LLP

(57) ABSTRACT

An autonomous vehicle capable of determining its position in a space through improved communications with beacons is disclosed. The autonomous vehicle utilizes time of flight as well as angular information to determine position, and is capable of intelligent interaction with the beacons.

19 Claims, 2 Drawing Sheets

U.S. PATENT DOCUMENTS 7,026,992 B1 4/2006 Hunt et al.
7,328,088 B2 2/2008 Kim et al.

FOREIGN PATENT DOCUMENTS

KR 10-0633160 B1 10/2006
KR 10-0794728 B1 1/2008

OTHER PUBLICATIONS

Ghidary, Saeed Shiry et al. "A new Home Robot Positioning System (HRPS) using IR switched multi ultrasonic sensors". Dept. of computer and systems engineering, Fac. of Engineering, Kobe Univeristy, 657-8501, Japan.

Kim, Su Yong et al. "Performance Analysis of UPS (Ultrasonic Positioning System) Using DGPS". 07-7803-8730-9/04/$20.00 2004. IEEE. pp. 609-613.

Kiriy, Evgeni. "A Localization System for Autonomous Golf Course Mowers". Electrical and Computer Engineering. McGill University, Montreal. Nov. 2002.

Makela, Hannu. "Outdoor Navigation of Mobile Robots". Acta Polytechnica Scandinavica, Mechanical Engineering Series No. 155, Espoo 2001, 137 p. Published by the Finnish Academies of Technology, ISBN 951-666-587-X, ISN 0001-687X.

Priyantha, Nissanka Bodhi. "The Cricket Indoor Location System". Massachusetts Institute of Technology. Department of Electrical Engineering and Computer Science. May 19, 2005.

Yenilmez, Levent et al. "Real Time Multi-Sensor Fusion and Navigation for Mobile Robots". 0-7803-3879-0/98/$10.00. IEEE. pp. 221-225.

Zeitzew, M. "Autonomous Utility Mower". Agricultural Engineering International: the CIGR Ejournal. Manuscript ATOE 07 016. vol. IX. Jul. 2007.

PCT Seach Report Dated Mar. 10, 2010.

* cited by examiner

SYSTEM AND METHOD FOR AUTONOMOUS VEHICLE LOCALIZATION

FIELD OF THE INVENTION

The present invention relates to a system and method for providing localization information with respect to a mobile vehicle. In particular, the present invention concerns communications using beacons in order to determine the position of an autonomous robot.

BACKGROUND OF THE INVENTION

The prior art includes beacon positioning systems which use sonic or electromagnetic signals, but these system only make use of either time of flight or angular information. If one of the beacons in these systems becomes unreachable they can no longer function. A system and method for positioning is needed which will provide increased precision and robustness compared to the prior art positioning systems. Also the systems in the prior art do not take full advantage of encoding useful information into the signals, calculating the impact of changes in terrain, nor do they adequately compensate for varying environmental conditions and their effect upon a calculated position.

SUMMARY OF THE INVENTION

In one form a system is provided for determining the location of an autonomous vehicle within a predefined work area. According to the illustrative embodiment, a mobile robot transmits a sonic signal which is received by a fixed beacon which in turn transmits an electromagnetic signal to be received by the mobile robot. The mobile robot determines from the received electromagnetic signal both the angle of reception and the time of flight of the sonic signal. These two pieces of information, combined with a mobile robot heading, fix the position of the mobile robot in a space while utilizing only one beacon.

In a further form, the system utilizes stationary sonic receivers on both the mobile robot and beacons to improve the results obtained from the time of flight information. By analyzing the signals obtained from the stationary receivers the mobile robot can more accurately calculate the time of flight of the sonic signal by adjusting for various environmental conditions such as temperature, wind, and air turbulence.

In a still further form, the electromagnetic receiver on the mobile robot is an array of individual electromagnetic receivers allowing for a much more accurate determination as to the angle of receipt of the electromagnetic signal. The results from multiple individual receivers can be combined to reduce error and produce a result more accurate than possible when using a single receiver alone.

In yet another form, multiple beacons are present and available for communication with the mobile robot. In this embodiment extra steps are taken to ensure that there no confusion is caused by the receipt of multiple electromagnetic signals. In one form, the sonic signals are transmitted in only specific directions. In another form, the sonic signals include discriminating information. In a further form, when it is desired that multiple signals be in the air simultaneously, the sonic signals are uniquely encoded so as to allow the mobile robot to ascertain the beacon from which they originated.

In yet another form, the mobile robot includes an inclinometer which provides information regarding the deviation of the mobile robot from a specified axis. This allows the mobile robot to compensate for changes in the terrain which could produce inaccuracies in the time of flight and angular reception measurements. As the mobile robot pitches and rolls the distance from the top of the communications tower to a beacon is different than the distance from the base of the mobile robot to a beacon. Since the height of the communications tower is known the deviation information provided by the inclinometer allows for the correction of these distances.

According to a still further form, the beacons can replicate various aspects of the sonic signal in the electromagnetic transmission rather than simply broadcasting an electromagnetic signal upon the receipt of a sonic signal. This allows the mobile robot to receive the replicated signal and analyze the signal to make determinations about the medium in which the sonic signal traveled as well as its reliability.

The sonic transmitter is preferably an array of individual sonic transmitters. These sonic transmitters can be individually controlled. By varying the phase of the individually broadcast signals the mobile robot can create constructive and destructive interference within the sonic signal. This allows the range to be extended in the case of constructive interference or for dead spots to be created to prevent the reception of the sonic signal by a particular beacon.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DESCRIPTION OF THE SPECIFIC EMBODIMENTS

Figure 1:
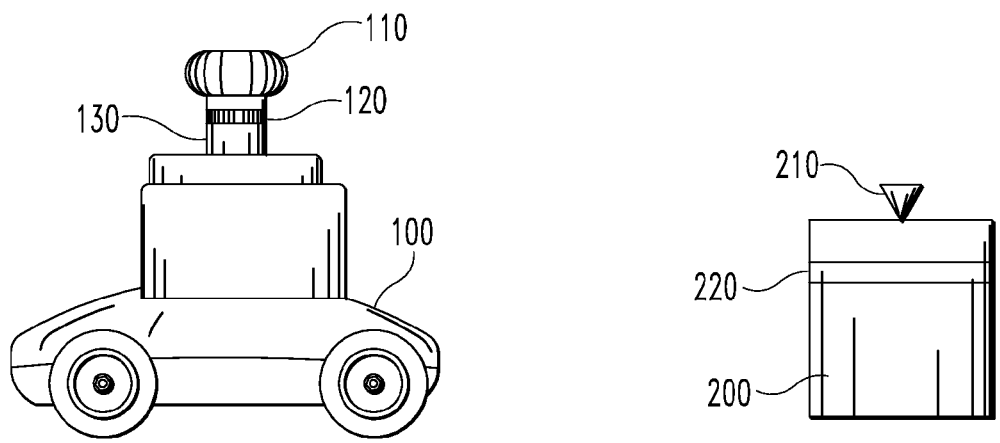
FIG. 1 illustrates a mobile robot and a beacon according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The illustrative embodiment of the present invention will be described with reference to FIG. 1. The autonomous vehicle includes a mobile robot 100 which is free to navigate its space and perform assigned tasks, such as, but in no way limited to, sorting boxes, picking merchandise, vacuuming a floor, or mowing a lawn. The mobile robot 100 includes a sonic transmitter 110 for transmitting a sonic signal such as sounds audible to humans and ultrasonic sounds. The mobile robot 100 also includes an electromagnetic receiver 120 that is capable of receiving electromagnetic waves such as, for purposes of non-limiting example, light or radio waves. The electromagnetic receiver 120 is further capable of determining an angle of reception of the electromagnetic wave. Preferably, the electromagnetic receiver 120 on the mobile robot includes an array of individual electromagnetic receivers allowing for a more accurate determination as to the angle of receipt of the electromagnetic signal.

The mobile robot 100 communicates with a beacon 200 to determine the position of the mobile robot 100 within a predefined space. The beacon 200 includes a sonic receiver 210 for receiving the sonic energy transmitted from the sonic transmitter 110 of mobile robot 100. The beacon 200 also includes an electromagnetic transmitter 220 for transmitting electromagnetic waves to the electromagnetic receiver 120 of mobile robot 100. The mobile robot 100 can determine information about its location relative to the beacon 200 by determining the angle of reception of the electromagnetic wave.

In a further form, time of flight information, indicating the time a signal takes to reach its destination or be returned, can be calculated in order to further determine the present location of the mobile robot 100. First, the mobile robot 100 transmits a sonic signal and the beacon 200 responds to the sonic signal by transmitting an electromagnetic signal. The mobile robot 100 records the time required for the sonic signal to reach the beacon 200 and for the electromagnetic signal to return. By subtracting any known delays introduced by the beacon 200, such as a preprogrammed delay, and treating the time of flight of the electromagnetic signal as negligible, as compared to the sonic signal, the time of flight of the sonic signal can be calculated. Alternatively, the time of flight of the electromagnetic signal can be obtained and then subtracted using the speed of the electromagnetic signal and the last known distance to the beacon 200. Using the speed of sound, this time of flight measurement can be converted to a distance. The calculated distance coupled with the angle of reception and error correction, based upon the previous heading of the mobile robot 100, which is preferably stored in an internal memory, allows the mobile robot 100 to determine a specific location relative to the position of the beacon 200. If the absolute position of the beacon 200 is known then the absolute position of the mobile robot 100 can also be calculated. If the heading of the mobile robot 100 is not known then the location of the mobile robot 100 can be fixed on a circle relative to the beacon 200.

Figure 2:
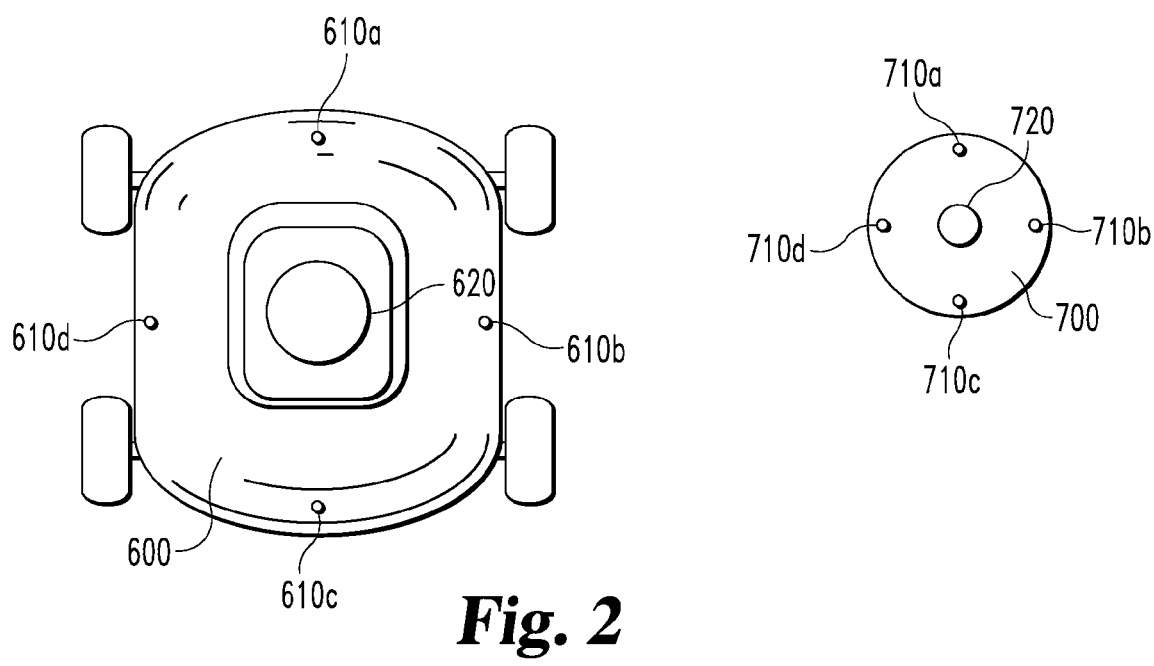
FIG. 2 illustrates a top view of both the mobile robot and a beacon with stationary receivers according to a further embodiment of the present invention.

An further embodiment of the present invention will now be described with reference to FIG. 2, which shows a top view of the mobile robot 600 and a beacon 700. In some embodiments, the accuracy of the calculated distance is improved by compensating for variances in the speed of sound. One such method involves measuring environmental factors such as temperature and pressure. However, the preferred method involves measuring the speed of sound at the mobile robot 600, at the beacon 700, or at both. By placing a stationary sonic receiver 610a on the mobile robot 600 a time of flight measurement can be taken between sonic transmitter 620 and the stationary receiver 610a. Since the distance between the two is fixed and known, the speed of sound can be easily calculated. The mobile robot 600 can cause the sonic transmitter 620 to transmit a sonic signal intended specifically for the stationary receiver 610a or the stationary receiver 610a can take a time of flight measurement each time the sonic transmitter 620 transmits a sonic signal intended for a beacon 700.

When the mobile robot 600 includes additional stationary receivers 610b, 610c, and 610d in addition to 610a calculations for the speed of sound in any direction can be made. Once again, the sonic transmitter 620 can be caused to transmit a sonic signal intended specifically for the stationary receivers 610, or the stationary receivers 610 can take a time of flight measurement when the sonic transmitter 620 transmits a sonic signal intended for a beacon. With a sufficient number and placement of additional stationary receivers the speed of sound can be measured in any direction. While four of stationary receivers 610 makes the calculations for determining the speed of sound in any direction in a two dimensional plane, it should be noted that three stationary receivers could accomplish the same. In addition to receiving a sonic signal transmitted by the sonic transmitter 620, dedicated individual sonic transmitters can be added to the mobile robot 600 for the purpose of taking speed of sound measurements.

A beacon 700 can also take time of flight measurements for purposes of calculating the speed of sound by utilizing stationary receivers (710a, 710b, 710c, 710d) fixed on the beacon 700. As the sonic signal, transmitted specifically for the purpose of calculating speed of sound or in the normal course of localization, arrives at the beacon each of the four stationary receivers 710 and the primary sonic receiver 720 take a time measurement. As with the mobile robot 600, since the distances between the sonic receiver 720 and the stationary receivers 710 is fixed and known, the speed of sound in each direction can be calculated. Once again, with a sufficient number and location of stationary receivers the speed of sound can me be measured in any direction, including in three dimensions. Also, like on the mobile robot, including four stationary receivers 710 makes the speed of sound calculations less complex, as three stationary receivers would be sufficient to measure the speed of sound in any direction in a two dimensional plane.

Once again referring to FIG. 1, in some embodiments, the electromagnetic receiver 120 on the mobile robot 100 includes an array of individual receivers distributed around the communications tower 130. The signal strength received at various individual receivers can be compared to calculate the angle of reception with more precision. Some embodiments utilize light as the electromagnetic wave. Specifically, infrared light has the advantage of being less prone to interference from ambient light. When light is utilized as the electromagnetic wave the small nature of individual light receivers allows for the construction of an array of individual receivers with a very high degree of angular precision.

In some embodiments of the present invention statistical analysis and error correction are performed on the localization data gathered by the mobile robot 100. Temporal projections of future vehicle positions allow the mobile robot 100 to know its current heading. This is possible since it is likely that the mobile robot 100 is going in the same direction at any given time as the last known direction. The incorporation of other sensors, such as an odometry sensor, allows these predictions to be more accurate than pure probabilities alone. Using this heading information the mobile robot 100 is able to fix its position in the space with the use of only one beacon 200.

Figure 3:
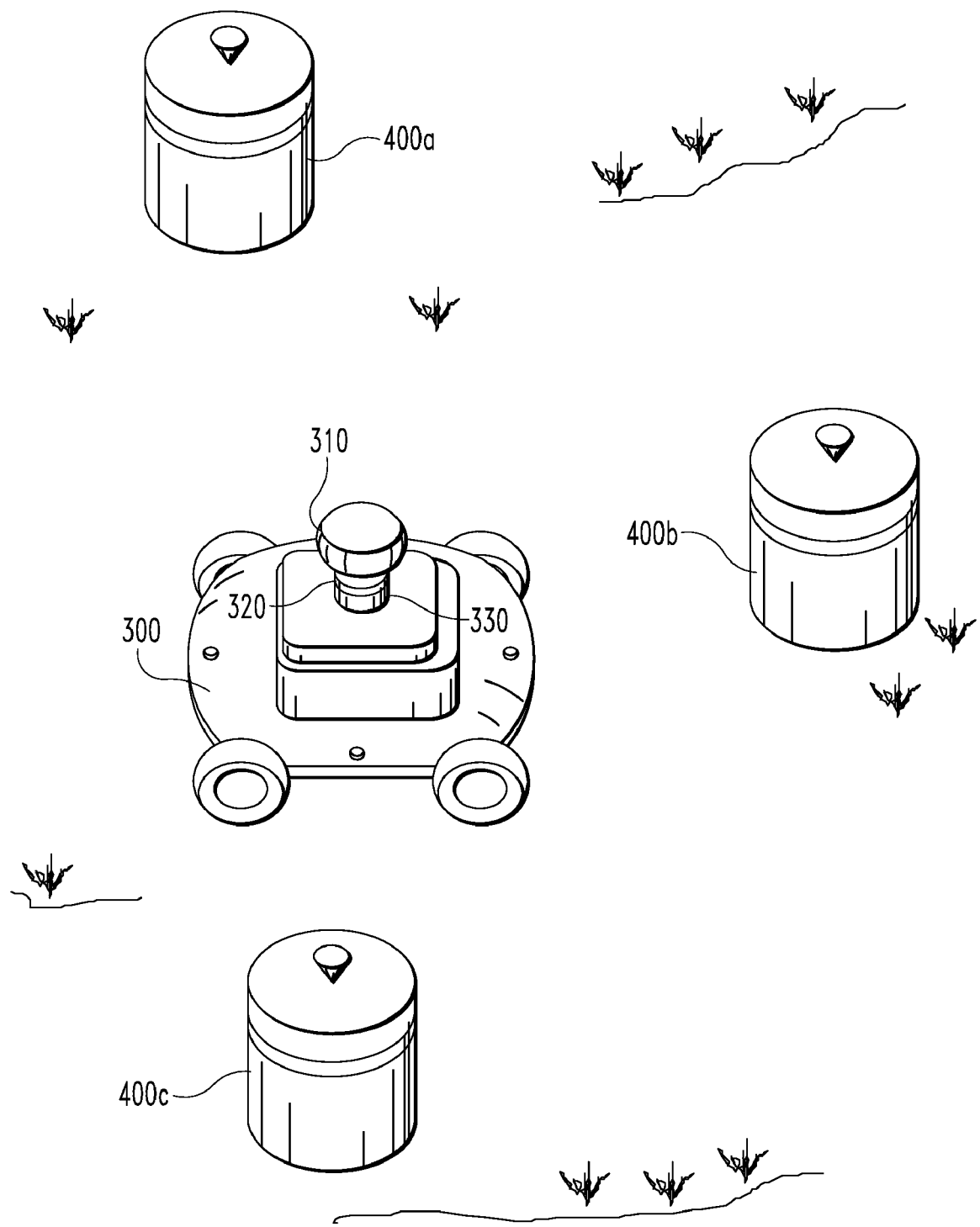
FIG. 3 illustrates a mobile robot and multiple beacons according to another embodiment of the present invention.

Discussion of an alternate embodiment of the invention will now be made with reference to FIG. 3. FIG. 3 shows three beacons (400a, 400b, and 400c), but virtually any number of beacons could be utilized to expand the work area of the mobile robot 300, to improve localization accuracy, or to create a more redundant system. With multiple beacons the mobile robot 300 may transmit a signal to each of the beacons 400. Pinging refers to the process of transmitting a sonic signal to the beacons 400 and awaiting and receiving a response. This is possible by either actually starting and stopping the sonic signal or indicating starting and stopping points through modulation of the sonic signal. The mobile robot 300 is also able to receive and distinguish multiple electromagnetic signals from the various beacons 400 based upon, for example, their transmission time, frequency, encoded identified, or the like.

In one form of the present embodiment, the mobile robot 300 pings all beacons 400 simultaneously. Depending on the distance between the mobile robots 300 and each of the beacons 400 the electromagnetic signals may arrive at the mobile robot 300 at approximately the same time. As the angle of reception can be determined by the electromagnetic receiver 320, the electromagnetic signals can be discriminated from one another as long as they are separated at least by the angular precision of the electromagnetic receiver 320. To further distinguish the electromagnetic signals from multiple beacons 400 the mobile robot 300 can predict the approximate arrival time of the electromagnetic signal based on the previous time of flight to that particular beacon 400. Predicting the arrival time of the electromagnetic signal has the added benefit of discriminating between actual electromagnetic signals transmitted by a beacon 400 and ambient electromagnetic noise.

In another form, the mobile robot 300 pings the beacons 400 in a predetermined pattern. In this embodiment the sonic transmitter 310 includes an array of individual sonic transmitters, each one capable of transmitting independently of the other individual sonic transmitters. The sonic transmitter 310 transmits the required plurality of sonic signals by activating the individual sonic transmitters in a predetermined pattern, such as sequentially around the communications tower 330. Depending on the environment and the position of the beacons 400 relative to the mobile robot 300, various predetermined patterns can simplify the receipt of multiple electromagnetic signals by the mobile robot 300.

In yet another embodiment, the mobile robot 300 is configured to transmit the plurality of signals in specific calculated directions and at specific times. The sonic signals are only transmitted in the direction of a particular beacon 400. Instead of activating the entire sonic transmitter 310 array the mobile robot 300 only activates the individual transmitters in the direction of a beacon 400. The mobile robot 300 can ping each of the beacons 400 simultaneously, sequentially, or in any temporal pattern which is beneficial to the localization process. Only activating the required individual transmitters has several advantages including: reducing the likelihood of spurious reflections, reducing the likelihood of destructive interference, and reducing power requirements.

In many of the embodiments, the time between pings sent to each of the beacons 400 is short enough that more than one of the sonic signals may be in the air simultaneously. In order to remove ambiguity as to which sonic signal the currently detected electromagnetic signal is a response to the signals are encoded using a unique identifier. The mobile robot 300 encodes an identifier in the sonic signal. The beacons 400 then encode the same identifier into the responsive electromagnetic signal allowing the mobile robot 300 to correctly distinguish between various rounds of pings. The identifiers can be reused so long as there is only ever one instance of the identifier in the air at a given time.

In addition to encoding identifiers in the sonic and electromagnetic signals, virtually any type of data can be encoded in the signal. In one embodiment, the mobile robot 300 and the beacons 400 exchange data relevant to the calculation of the mobile robot's 300 position. Examples of data exchanges between the mobile robot 300 and the beacons 400 include: localization data regarding the position of the mobile robot 300 and the beacons 400, signal discrimination data for directly identifying which beacon 400 transmitted the signal, and signal quality data such as sonic signal strength received at the beacon 400. Signal quality data is either encoded into the electromagnetic signal as a representative number or an actual outline of the signal received could be mapped directly onto the electromagnetic signal. Other examples of data capable of being encoded include environmental data, information exchange, and commands. Examples of environmental data includes data relating to wind, temperature, humidity and the like, which are useful for more precisely calculating the speed of sound or adjusting operation of the mobile robot 300 to accommodate conditions which might otherwise interfere with normal operation. Other information exchanged can include information regarding battery power levels or reports on failing components. In embodiments of the invention where the beacons 400 are capable of performing speed of sound measurements on the sonic signal, the information obtained from the local measurement is encoded in the electromagnetic signal and sent to the mobile robot 300. Commands could also be sent to the beacons 400 by encoding instructions in the signals. A typical example of this might be the mobile robot 300 instructing the beacons 400 to momentarily power down or to provide the mobile robot 300 with informational or environmental data.

In the preferred embodiment of the present invention, the mobile robot 300 utilizes both distance to the beacons 400 and the angle of reception of the electromagnetic signal from the beacons 400 in determining the position of the mobile robot 300 within the work area. However, when the time of flight information used to determine distance between the mobile robot 300 and the beacons 400 is deemed to be unreliable, the mobile robot 300 can determine localization information using only the angles of reception. Also, communication with the closest beacon 400 to the mobile robot 300 is often deemed to provide the most accurate time of flight measurement. The mobile robot 300 can choose to use the shortest time of flight measurements and two angles to determine the position of the mobile robot 300 with the most accuracy. Given enough beacons 400 providing time of flight and angular reception information the full position and pose of the mobile robot 300 can be calculated in three dimensions.

In a further embodiment, the effects of varying mobile robot 300 inclinations are compensated for through the use of an inclinometer. As the mobile robot 300 moves around the terrain the changing inclination of the communications tower 330 may cause the distance between the communications tower 330 and the beacons 400 to differ from the distance between the base of the mobile robot 300 and the beacons 400. To compensate for this variable inclination an inclinometer is placed on the mobile robot 300. The inclinometer measures the angle of deviation in the vertical axis of the mobile robot 300 from a specified vertical axis. Normally, the specified vertical axis will be parallel with the pull of gravity, but there may be times when it is advantageous to specify another axis, for example, where the vertical axis is perpendicular to the surface of the work area.

Since the height of the electromagnetic receiver 320 is known, the distance that the electromagnetic receiver 320 is displaced from the center of the base of the mobile robot 300 can be calculated using the angle of inclination from the specified vertical axis. The mobile robot 300 uses the distance of displacement from the axis to correct the position which is calculated in reference to the beacons 400. This correction is useful for both time of flight measurements and the position calculations based upon the angle of reception. The correctional information provided by an inclinometer is useful no matter how many beacons 400 are utilized in the system and without regard to the communication methods utilized between the mobile robot 300 and the beacons 400.

In yet another embodiment, the beacon 400 receives the sonic signal from the mobile robot 300 and replicates various aspects of the sonic signal in the electromagnetic signal which is transmitted to the mobile robot 300. Many aspects of the sonic signal can be replicated including duration, amplitude, frequency, and various kinds of modulation. Often times, variations in the sonic signal are created when the sonic signal passes through various environmental conditions during flight. By examining the replicated signal, the mobile robot 300 can determine the presence of environmental conditions and compensate for the environmental conditions in the localization calculations. Examples of environmental conditions include wind, air turbulence, and effective signal travel distance.

In addition to determining environmental conditions, analysis of the replicated signal provides for calculating the most accurate start and stop points to be used in the time of flight measurements. By determining a characteristic present in both the transmitted sonic signal and the received replicated signal a time marking positing superior to the beginning or end of the signals can be found. Also, analysis of the replicated signal for the presence of Doppler shift provides information relating to environmental conditions and the velocity of the mobile robot 300.

In another embodiment, the sonic transmitter 310 situation on the mobile robot 300 is configured to transmit a sonic signal which includes encoded information. The beacons 400 receive and interpret the encoded signal and are capable of returning the same encoded information in the electromagnetic signal or responding with different encoded information. The mobile robot 300 receives the electromagnetic signal and interprets any encoded information.

Although virtually any kind of information can be encoded in the sonic and electromagnetic signals, one particularly useful type of encoded data is a beacon identification code. The beacon identification code can be used to activate only a particular beacon 400 or to discriminate received electromagnetic signals from one another. Examples of other data exchanged between the mobile robot 300 and the beacons 400 includes: localization data regarding the position of the mobile robot 300 and the beacons 400, signal discrimination data for directly identifying which beacon 400 transmitted the signal, and signal quality data such as sonic signal strength received at the beacon 400. Signal quality data is either encoded into the electromagnetic signal as a representative number or an actual outline of the signal received could be mapped directly onto the electromagnetic signal. Other examples of data capable of being encoded include environmental data, information exchange, and commands. Examples of environmental data includes data relating to wind and temperature conditions useful for more precisely calculating the speed of sound or adjusting operation of the mobile robot 300 to accommodate conditions which might otherwise interfere with normal operation. Information exchange might include information regarding battery levels or reports on failing components. In embodiments of the invention where the beacons 400 are capable of performing speed of sound measurements on the sonic signal, the information obtained from the local measurement is encoded in the electromagnetic signal and sent to the mobile robot 300. Commands could also be sent to the beacons 400 by encoding instructions in the signals. A typical example of this might be the mobile robot 300 instructing the beacons 400 to momentarily power down or to provide the mobile robot 300 with informational or environmental data.

In another embodiment, the sonic transmitter 310 includes an array of individual sonic transmitters, each one capable of transmitting independently of the other individual sonic transmitters. By transmitting from multiple individual sonic transmitters simultaneously, constructive and destructive interference can be created. To utilize the constructive and destructive interference, the mobile robot 300 configures the phase of each of the sonic signals being transmitted by the individual sonic transmitters. This allows transmissions to exceed the normal transmission range. Also dead spots in the sonic signal can be created and controlled, for example a dead spot around a beacon 400 could be created to prevent the beacon 400 from receiving the sonic signal. Controlling which beacons 400 receive the transmitted sonic signal allows the mobile robot 300 to selectively ping beacons and avoid issues associated with receiving multiple electromagnetic signals simultaneously.

Also, the mobile robot 300 configures the frequency of each of the sonic signals being transmitted by the individual sonic transmitters. This allows for the creation of beats in the sonic signal, and provides an additional way to embed information into the sonic signal. Additionally, the mobile robot 300 may include an odometer, which allows for additional levels of error correction.

While the invention has been illustrated and described in detail in the drawings and foregoing description, the same is to be considered as illustrative and not restrictive in character. Only the preferred embodiment, and certain alternative embodiments deemed useful for further illuminating the preferred embodiment, have been shown and described. All changes and modifications that come within the spirit of the invention are desired to be protected.

What is claimed is:

1. An autonomous vehicle comprising:
a mobile unit;
a sonic transmitter situated on the mobile unit and configured to transmit a sonic signal to a beacon located at a position that is remote from the mobile unit;
an electromagnetic receiver situated on the mobile unit configured to receive an electromagnetic signal generated by the beacon in response to the sonic signal from the transmitter and to determine an angle of reception of the received electromagnetic signal and time of flight information of the sonic signal over a path from the mobile unit to the beacon; and
a processor configured to utilize the determined angle of reception and time of flight information to determine a current position of the mobile unit relative to the beacon; wherein said processor assigns a dynamic weight to each of the determined angle of reception and time of flight information.

2. The autonomous vehicle of claim 1, further comprising a sonic receiver situated on the mobile unit configured to receive the sonic signal and determine time of flight information of the sonic signal over a path from the transmitter to the sonic receiver.

3. The autonomous vehicle of claim 2, further comprising a plurality of sonic receivers configured to collect time of flight information of the sonic signal and calculate a sonic speed adjustment factor.

4. The autonomous vehicle of claim 1, further comprising a beacon.

5. The autonomous vehicle of claim 4, wherein the beacon comprises two or more sonic receivers configured to collect and evaluate an impact of the environment on the sonic signal from any direction.

6. The autonomous vehicle of claim 4, further comprising:

an inclinometer situated on the mobile unit and configured to provide compensation information; and wherein said processor is further configured to utilize the determined time of flight information of the sonic signal and the provided inclinometer information to determine said current position.

7. The autonomous vehicle of claim 6, wherein the compensation information includes an angle of deviation of a central vertical axis of the autonomous vehicle from a specified vertical axis.

8. The autonomous vehicle of claim 6, wherein the receiver additionally determines an angle of reception of the received electromagnetic signal relative to the mobile unit and the processor is configured to further utilize the angle of reception in determining the position of the base of the mobile unit relative to a beacon.

9. The autonomous vehicle of claim 1, wherein the receiver comprises an array of electromagnetic sensing devices configured to calculate the angle of reception as a function of signal strength detected by one or more of the array of electromagnetic sensing devices.

10. The autonomous vehicle of claim of claim 9, wherein the received electromagnetic signal comprises light.

11. The autonomous vehicle of claim 1, wherein the receiver is configured to perform a temporal projection of vehicle position relative to the beacon based upon at least a prior position of the autonomous vehicle.

12. The autonomous vehicle of claim 11, further comprising an odometer situated on the mobile unit and configured to provide odometry information to enhance the future estimate of position.

13. The autonomous vehicle of claim 1, wherein:
the transmitted sonic signal comprises a ping;
the sonic transmitter is further configured to transmit a plurality of pings to a plurality of beacons; and
the electromagnetic receiver is further configured to receive the plurality of electromagnetic signals from a plurality of beacons in response to the plurality of pings.

14. The autonomous vehicle of claim 13, wherein the sonic transmitter is further configured to transmit the plurality of pings simultaneously.

15. The autonomous vehicle of claim 13, wherein the sonic transmitter is further configured to transmit the plurality of pings in a predetermined sequential pattern.

16. The autonomous vehicle of claim 13, wherein the sonic transmitter is further configured to transmit each ping within the plurality of pings in a specific direction.

17. The autonomous vehicle of claim 13, wherein each one of the plurality of pings includes a unique identifier.

18. The autonomous vehicle of claim 17, wherein the electromagnetic receiver is further configured to receive the electromagnetic signal from a beacon in response to one of the plurality of pings which includes a replication of the unique identifier of the received ping.

19. The autonomous vehicle of claim 1, wherein at least one of the sonic signal and the electromagnetic signal includes encoded data.

* * * * *